Aug. 18, 1964  G. V. WOODLING  3,145,288
WELDABLE STUD HAVING LOCATION CENTERING MEANS
Filed April 12, 1961

INVENTOR.
GEORGE V. WOODLING
BY
Woodling, Krost, Granger and Rust
attys

United States Patent Office 3,145,288
Patented Aug. 18, 1964

3,145,288
WELDABLE STUD HAVING LOCATION
CENTERING MEANS
George V. Woodling, 22077 W. Lake Road,
Rocky River, Ohio
Filed Apr. 12, 1961, Ser. No. 102,464
7 Claims. (Cl. 219—99)

The invention relates to weldable studs which are adapted to be electrically welded to a plate, beam or other metal body.

In the welding of studs to a body member, it is preferable that the studs be fixed relative to the body member, both in an axial direction as well as in a lateral direction. The fixing of the studs in a lateral direction is usually achieved by having a point on the studs which fits into a standard V-shaped punch mark provided in the body member. The point has many objectionable features which interferes with the making of consistently sound welds.

An object of the present invention is to discard the point on the stud and provide thereon in its stead a new type of centering means to insure the making of consistently sound welds.

Another object of the invention is the provision of a new type of centering means which consistently positions the stud relative to the body member, both in an axial direction as well as in a lateral direction.

Another object of the invention is the provision of weldable stud means having a flux element in the weldable end with said flux element having the new type of centering means on the end thereof.

Another object of the invention is the provision of a stud having an end surface area larger than the opening of the V-shaped punch mark and a projection member extending in an axial direction from the surface area for protrusion into the V-shaped punch mark, wherein the surface area in the weldable position of the stud engages a portion of the body member surrounding the opening of the V-shaped punch mark to consistently fix the welding position of the stud relative to the body member in an axial direction and wherein the projection member terminates in a flat surface defining an annular edge which is contactable with the sloping side of the V-shaped punch mark to resist the projection member from shifting in a lateral direction out of the V-shaped punch mark.

Other objects and a fuller understanding of the invention may be had by referring to the following description and claims taken in conjunction with the accompanying drawings, in which:

Figure 1:
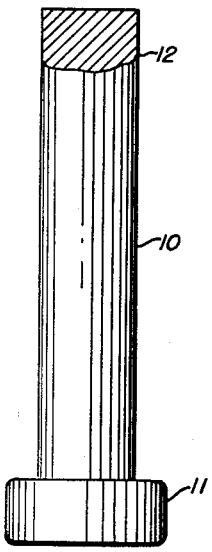
FIGURE 1 shows a side elevational view of a stud having an upper weldable end portion adapted to be processed in accordance with my invention, the stud shown in FIGURE 1 being drawn to substantially full scale.
Figure 2:
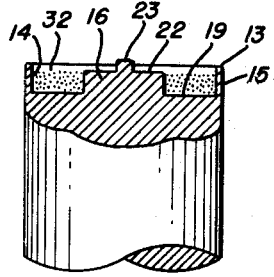
FIGURE 2 is a cross-sectional view of the weldable end portion of the stud which is drawn to double scale, and showing a step of providing an annular recess with flux in the end thereof.
Figure 3:
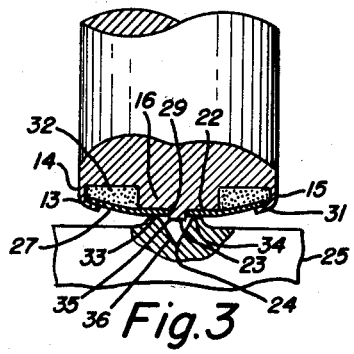
FIGURE 3 shows the finished stud drawn to double scale with the new type of centering means positioned in a V-shaped punch mark.

With reference to FIGURE 1, the stud is indicated by the reference character 10 and may have a head 11 as shown, or instead of the head, it may be provided with threads or other means. The upper end of the stud is designated as the weldable end portion and is indicated by the reference character 12. The process of manufacturing the weldable end portion of the stud comprises the machining of an annular cavity 19 in the end thereof. This machining produces an integral flange 13 and an integral center core 16. The integral flange 13 has an inside surface 14 and an outside surface 15. The center core 16 has an end abutment surface 22 and an integral projection member 23 extending axially from the end abutment surface 22.

A cap 27 covers the cavity 19 and defines with the cavity a chamber for holding flux indicated by the reference character 32. The cap 27 has an outer peripheral edge surface fitting within and spaced from the inside surface 14 of the flange. The outer peripheral edge surface of the cap 27 is unsupported. The cap has an outside and inside surface with an opening 29 extending therethrough into which the projection member 23 projects. The inside surface of the cap has a marginal peripheral inner portion surrounding the opening 29 and faces the end abutment surface 22 of the core. The outside surface of the cap 27 has a marginal peripheral outer portion engaged by an in-bent portion 31 of the flange 13, with the inside surface 14 thereof overlapping the marginal peripheral outer portion of the outside surface of the cap and holds the marginal peripheral inner portion of the inside surface of the cap 27 against the end abutment surface 22 of the core. The flux 32 is confined by the cap within the cavity 19. The projection member 23 fits snugly within the opening 29 of the cap to keep the flux from escaping.

The projection member 23 extends beyond the end cap 27 in an axial direction for protrusion into a V-shaped punch mark 24 provided in a body member 25 to which the stud is to be welded. The projection member 23 has a cross-sectional area less than that of the opening of the V-shaped punch mark. The outside surface of the end cap 27 surrounding the projection member 23 has a surface area 33 which, in the weldable position of the stud, engages an annular raised portion 34 of the body member 25 surrounding the opening of the V-shaped punch mark 24. The annular raised portion 34, being exaggerated in the drawings, is the result of the flow in the metal of the body when making the V-shaped punch mark. The annular raised portion 34 and the surface area 33 of the cap 27 make an annular peripheral contact with each other which consistently fixes the welding position of the stud relative to the body 25 in an axial direction to insure the making of consistently sound welds. The annular peripheral contact between the surface area 33 of the end cap 27 and the raised portion 34 provides a peripheral area for the initiation of the arc to give a consistent weld and avoids a point initiation of the arc which lacks consistent performance.

The projection member 23 terminates in a flat surface defining an annular edge 35 which is contactable with the sloping side 36 of the V-shaped punch mark to resist the projection member 23 from shifting in a lateral direction out of the V-shaped punch mark 24. The annular edge 35, upon contacting the sloping side 36, does not tend to slide up along the slope and out of the V-shaped punch mark as easily as it would if the projection member were rounded at the end or pointed. The projection member 23 is relatively short and does not fix the position of the stud relative to the body member 25 in an axial direction as it would do if it were longer and pointed. If the projection member were longer and pointed, then the point would fit into the bottom of the V-shaped punch mark and the axial positioning of the weldable end of the stud relative to the body member would be determined in accordance with the depth of the V-shaped punch mark which may vary from mark-to-mark. In the present invention, it is the annular peripheral engagement between the end cap 27 and the raised portion 34 that fixes the axial position of the stud relative to the body member 25. This insures consistently sound welds. The initiation of the arc on a point is relatively unstable as it tends to burn away too fast before the arc itself becomes stable in operation.

The projection member 23 need not be long; in fact, it functions well so long as the annular edge 35 makes a "nick-like" engagement with the sloping side 36 of the V-shaped punch mark. It needs to be only long enough to provide the annular edge 35. So long as one's fingernail can detect the annular edge, this is sufficient. The height of the projection member 23 may be as low as a few thousandths of an inch, in the order of about .004 inch as a minimum and may extend as a maximum to about .040 inch, although the preferable height is about .010 inch to .030 inch. It operates somewhat like a square shouldered nick, and being short, it is not apt to be damaged by handling as it would be if it were longer. The diameter of the projection may range from a minimum value of .040 inch to .090 inch, the latter being smaller than the usual standard diameter of the opening of the V-shaped punch mark.

Figure 4:
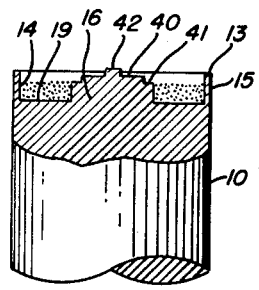
FIGURE 4 is a view similar to FIGURE 2, with a modified form of the invention.
Figure 5:
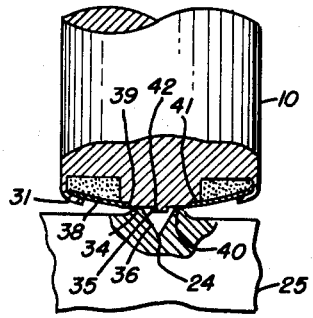
FIGURE 5 is a view similar to FIGURE 3, with the stud having the modified form of the invention shown in FIGURE 4.

The FIGURES 4 and 5 show a modification of the invention, in that the aperture 39 in the cap 38 is larger and fits snugly about the center core which is provided with a terminal surface area 40 that directly engages the raised portion 34 of the body member 25. The inside surface of the cap faces an enlarged abutment surface 41. The terminal surface area 40 is larger in area than the opening of the V-shaped punch mark, and in this embodiment of the invention, the arc is initiated with the parent metal of the stud instead of with the end cap. The projection member in FIGURES 4 and 5 is identified with the reference character 42 and has a flat end defining the same annular edge 35 as shown in the other views of the drawing. The projection member 42 has the same dimensions with reference to the surface area 40 as does the projection member 23 with reference to the surface area 33 of the end cap 27.

Figure 6:
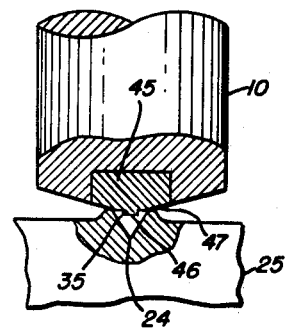
FIGURE 6 shows a stud provided with a built-in flux element having the new type of centering means on the end thereof.
Figure 7:
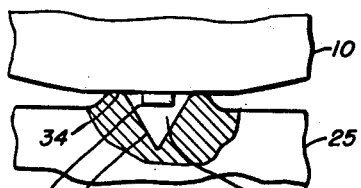
FIGURE 7 is an enlarged view, drawn substantially to four-times scale, of the end of the stud positioned relative to the V-shaped punch mark.

The FIGURE 6 shows a stud provided with a built-in flux element, 45, such for example as aluminum or any other suitable member, with the flux element 45 having the new type of centering means which comprises a surface area 47 and a projection member 46 having the same annular edge 35 as shown in the other views. The surface area 47 engages the raised portion 34 in the weldable position of the stud.

The projection members 23, 42 and 46 may be shaped by any suitable mechanical means such as by machining, metal working, grinding, pressing or the equivalent. Preferably, they do not extend into the V-shaped punch mark beyond one-half of the total depth of the punch mark, which gives assurance that the initiation of the arc is made on the peripheral area where the stud engages the annular raised portion of the body member and not at the end of the projection members.

The outer side surface of the projection members 23, 42 and 46 is cylindrical and straight and terminates in a square corner or annular edge 35 where it meets with the flat end. Rounded corners or tapered sides do not give the same results as the "nick-like" engagement provided by the present invention.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In weldable stud means to be welded to a body member having a V-shaped punch mark therein with sloping sides, centering means on said stud means, said centering means comprising an end surface area larger than the opening of the V-shaped punch mark, said surface area in the weldable position of the stud means engaging a portion of said body member surrounding the opening of the V-shaped punch mark and thereby fixing the weldable position of the stud means relative to the body member in an axial direction, and a projection member extending in an axial direction from said surface area and adapted for protrusion into said V-shaped punch mark, said projection member having a cross-sectional area less than that of the opening of the V-shaped punch mark, said projection member having a length in the approximate range of .004 to .040 inch and a diameter in the approximate range of .040 to .090 inch, said projection member terminating in a flat surface defining an annular edge which is contactable wtih the sloping side of the V-shaped punch mark to resist the projection member from shifting in a lateral direction out of the V-shaped punch mark, said annular edge when said projection member is in the center of said punch mark being spaced from the sides of said punch mark, whereby the axial spacing of the weldable stud means with respect to said body member is fixed by said surface area resting on the portion of the body member surrounding the opening of the V-shaped punch mark.

2. In weldable stud means to be welded to a body member having a V-shaped punch mark therein with sloping sides, centering means on said stud means, said centering means comprising an end surface area larger than the opening of the V-shaped punch mark, and comprising an integral terminating end of said stud means, said surface area in the weldable position of the stud means engaging a portion of said body member surrounding the opening of the V-shaped punch mark and thereby fixing the weldable position of the stud means relative to the body member in an axial direction, and a projection member extending in an axial direction from said surface area and adapted for protrusion into said V-shaped punch mark, said projection member having a cross-sectional area less than that of the opening of the V-shaped punch mark, said projection member having a length in the approximate range of .004 to .040 inch and a diameter in the approximate range of .040 to .090 inch, said projection member terminating in a flat surface defining an annular edge which is contactable with the sloping side of the V-shaped punch mark to resist the projection member from shifting in a lateral direction out of the V-shaped punch mark, said annular edge when said projection member is in the center of said punch mark being spaced from the sides of said punch mark, whereby the axial spacing of the weldable stud means with respect to said body member is fixed by said surface area resting on the portion of the body member surrounding the opening of the V-shaped punch mark.

3. In weldable stud means to be welded to a body member having a V-shaped punched mark therein with sloping sides, said weldable stud means having an end cap confining flux means therein, centering means on said stud means, said centering means comprising an end surface area larger than the opening of the V-shaped punch mark, and comprising a portion of said end cap, said surface area in the weldable position of the stud means engaging a portion of said body member surrounding the opening of the V-shaped punch mark and thereby fixing the weldable position of the stud means relative to the body member in an axial direction, and a projection member extending in an axial direction from said surface area and adapted for protrusion into said V-shaped punch mark, said projection member having a cross-sectional area less than that of the opening of the V-shaped punch mark, said projection member having a length in the approximate range of .004 to .040 inch and a diameter in the approximate range of .040 to 090 inch, said projection member terminating in a flat surface defining an annular edge which is contactable with the sloping side of the V-shaped punch mark to resist the projection member from shifting in a lateral direction out of the V-shaped punch mark, said annular edge when said projection member is in the center of said punch mark being spaced from the sides of said punch mark, whereby the axial spacing of the weldable stud means with respect to said body member is fixed by said surface area resting on the portion of the body member surrounding the opening of the V-shaped punch mark.

4. In weldable stud means to be welded to a body member having a V-shaped punch mark therein with sloping sides, said weldable stud means having a built-in flux element, centering means on said flux element, said centering means comprising an end surface area larger than the opening of the V-shaped punch mark, said surface area in the weldable position of the stud means engaging a portion of said body member surrounding the opening of the V-shaped punch mark and thereby fixing the weldable position of the stud means relative to the body member in an axial direction, and a projection member extending in an axial direction from said surface area and adapted for protrusion into said V-shaped punch mark, said projection member having a cross-sectional area less than that of the opening of the V-shaped punch mark, said projection member having a length in the approximate range of .004 to .040 inch and a diameter in the approximate range of .040 to .090 inch, said projection member terminating in a flat surface defining an annular edge which is contactable with the sloping side of the V-shaped punch mark to resist the projection member from shifting in a lateral direction out of the V-shaped punch mark, said annular edge when said projection member is in the center of said punch mark being spaced from the sides of said punch mark, whereby the axial spacing of the weldable stud means with respect to said body member is fixed by said surface area resting on the portion of the body member surrounding the opening of the V-shaped punch mark.

5. Weldable stud means to be welded to a body member having a V-shaped punch mark therein with sloping sides, said weldable stud means having an end surface area larger than the opening of the V-shaped punch mark, said surface area in the weldable position of the stud means engaging a portion of said body member surrounding the opening of the V-shaped punch mark and thereby fixing the welding position of the stud means relative to the body member in an axial direction, and a projection member extending in an axial direction from said surface area and adapted for protrusion into said V-shaped punch mark, said projection member having a cross-sectional area less than that of the opening of the V-shaped punch mark, said projection member having a length in the approximate range of .004 to .040 inch and a diameter in the approximate range of .040 to .090 inch, said projection member terminating in a flat surface defining an annular edge which is contactable with the sloping side of the V-shaped punch mark to resist the projection member from shifting in a lateral direction out of the V-shaped punch mark, said annular edge when said projection member is in the center of said punch mark being spaced from the sides of said punch mark, whereby the axial spacing of the weldable stud means with respect to said body member is fixed by said surface area resting on the portion of the body member surrounding the opening of the V-shaped punch mark.

6. Weldable stud means having a weldable end to be welded to a body member having a V-shaped punch mark therein with sloping sides, said weldable end having an integral center core provided with a terminal surface area larger than the opening of the V-shaped punch mark, said surface area in the weldable position of the stud means engaging a portion of said body member surrounding the opening of the V-shaped punch mark and thereby fixing the welding position of the stud means relative to the body member in an axial direction, and a projection member extending in an axial direction from said surface area and adapted for protrusion into said V-shaped punch mark, said projection member having a cross-sectional area less than that of the opening of the V-shaped punch mark, said projection member having a length in the approximate range of .004 to .040 inch and a diameter in the approximate range of .040 to .090 inch, said projection member terminating in a flat surface defining an annular edge which is contactable with the sloping side of the V-shaped punch mark to resist the projection member from shifting in a lateral direction out of the V-shaped punch mark, said annular edge when said projection member is in the center of said punch mark being spaced from the sides of said punch mark, whereby the axial spacing of the weldable stud means with respect to said body member is fixed by said surface area resting on the portion of the body member surrounding the opening of the V-shaped punch mark.

7. Weldable stud means having a weldable end to be welded to a body member having a V-shaped punch mark therein with sloping sides, said weldable end having an integral center core and a cavity surrounding the center core, said center core having a laterally extending abutment surface, a projection member extending in an axial direction from said abutment surface, flux means in said cavity, an end-cap confining said flux means in said cavity and having a central aperture through which said projection member extends with said end-cap facing said abutment surface, said end-cap having a surface area larger than the opening of the V-shaped punch mark, said surface area in the weldable position of the stud means engaging the body member surrounding the opening of the V-shaped punch mark and thereby fixing the welding position of the weldable end of the stud means relative to the body member in an axial direction; said projection member extending in an axial direction beyond said end-cap and adapted for protrusion into said V-shaped punch mark, said projection member having a cross-sectional area less than that of the opening of the V-shaped punch mark, said projection member having a length in the approximate range of .004 to .040 inch and a diameter in the approximate range of .040 to .090 inch, said projection member terminating in a flat surface defining an annular edge which is contactable with the sloping side of the V-shaped punch mark to resist the projection member from shifting in a lateral direction out of the V-shaped punch mark, said annular edge when said projection member is in the center of said punch mark being spaced from the sides of said punch mark, whereby the axial spacing of the weldable stud means with respect to said body member is fixed by said surface area resting on the portion of the body member surrounding the opening of the V-shaped punch mark.

References Cited in the file of this patent

UNITED STATES PATENTS

| | | |
|---|---|---|
| 2,760,797 | Woodling | Aug. 28, 1956 |
| 2,784,014 | Kelemen | Mar. 5, 1957 |
| 2,883,215 | Jenkins | Apr. 21, 1959 |
| 2,950,379 | Dash | Aug. 23, 1960 |
| 2,993,982 | Glover | July 25, 1961 |